(12) United States Patent
Zhu

(10) Patent No.: US 10,023,005 B2
(45) Date of Patent: Jul. 17, 2018

(54) VEHICLE WHEEL NOISE-REDUCING DAMPER

(71) Applicant: Qingjun Zhu, Beijing (CN)

(72) Inventor: Qingjun Zhu, Beijing (CN)

(73) Assignee: Qingjun Zhu, Beijing (CN)

( * ) Notice: Subject to any disclaimer, the term of this patent is extended or adjusted under 35 U.S.C. 154(b) by 72 days.

(21) Appl. No.: 15/320,031

(22) PCT Filed: Jun. 19, 2015

(86) PCT No.: PCT/CN2015/081903
§ 371 (c)(1),
(2) Date: Dec. 19, 2016

(87) PCT Pub. No.: WO2015/192799
PCT Pub. Date: Dec. 23, 2015

(65) Prior Publication Data
US 2017/0144479 A1 May 25, 2017

(30) Foreign Application Priority Data
Jun. 20, 2014 (CN) .......................... 2014 1 0280528

(51) Int. Cl.
*B60B 17/00* (2006.01)
(52) U.S. Cl.
CPC .......... *B60B 17/00* (2013.01); *B60B 17/0024* (2013.01); *B60B 2900/133* (2013.01); *B60Y 2306/09* (2013.01)
(58) Field of Classification Search
CPC ...................... B60B 17/0024; B60B 2900/133
(Continued)

(56) References Cited

U.S. PATENT DOCUMENTS 7,490,644 B2 * 2/2009 Yukawa ................ B60C 19/002
152/154.1
7,975,740 B2 * 7/2011 Yukawa ................ B60C 19/002
152/375
(Continued)

FOREIGN PATENT DOCUMENTS

CN 201456920 U 5/2010
CN 104354524 A 2/2015
(Continued)

OTHER PUBLICATIONS

The World Intellectual Property Organization (WIPO) International Search Report for PCT/CN2015/081903 dated Aug. 14, 2015 pp. 1-6.

*Primary Examiner* — Jeremy Luks
(74) *Attorney, Agent, or Firm* — Anova Law Group, PLLC

(57) ABSTRACT

This invention concerns a damper used to reduce the running noise of track wheels. It can absorb wheel vibration, reduce oscillation amplitude and reduce the noise radiation of the wheel. The damper has a damping connector and a damping ring which has an open section; the end of the open section has an angled plane; the damping connector has a pipe-shaped object with two locating objects at the both ends; the locating object has a bar which can get into the pipe-shaped object and a wedge-shaped object which matches the angled plane of the end of the open section; inside the pipe-shaped object is a spring which can push out the two locating objects; each locating object has a locating hole which allows a bar to get through from the pipe-shaped object.

8 Claims, 6 Drawing Sheets

(58) Field of Classification Search
USPC .................................................. 181/207, 208
See application file for complete search history.

(56) References Cited

U.S. PATENT DOCUMENTS

| | | | | |
|---|---|---|---|---|
| 8,997,806 B2* | 4/2015 | Tanno | ................... | B60C 19/002 |
| | | | | 152/157 |
| 2006/0108042 A1* | 5/2006 | Yukawa | .................... | B60B 3/04 |
| | | | | 152/450 |
| 2016/0082769 A1* | 3/2016 | Ishii | ...................... | B60B 21/026 |
| | | | | 301/63.101 |
| 2016/0297238 A1* | 10/2016 | Boh C | ................. | B60B 17/0024 |

FOREIGN PATENT DOCUMENTS

| | | | | |
|---|---|---|---|---|
| DE | 3119959 A1 * | 12/1982 | ......... | B60B 17/0017 |
| DE | 3316759 C1 | 10/1984 | | |
| EP | 0559999 A1 | 9/1993 | | |
| EP | 0976581 A2 | 2/2000 | | |
| EP | 2554399 A1 | 2/2013 | | |

* cited by examiner

VEHICLE WHEEL NOISE-REDUCING DAMPER

CROSS-REFERENCES TO RELATED APPLICATIONS

This application is a national phase entry under 35 U.S.C. § 371 of International Application No. PCT/CN2015/081903, filed on Jun. 19, 2015, which claims the priority of Chinese patent application Serial No. 201410280528.9, filed with the State Intellectual Property Office of P. R. China on Jun. 20, 2014, the entire contents of both of which are incorporated herein by reference.

FIELD OF THE DISCLOSURE

This invention concerns a noise-reducing damper used to reduce the noise arising from running track wheels.

BACKGROUND

One of the current noise-reducing methods is to install a damper on the wheel which absorbs the vibration energy from the wheel so as to increase the vibration damping, reduce noise radiation, and decrease the oscillation amplitude of the wheel. As such, the goal of reducing running noise can be achieved.

The noise-reducing damper is made of metal and comprised of a noise-reducing damping ring and a connector. The damper is installed in a ring-shaped groove. To install this damping ring, an open section of the ring and a connector which connects the open section is required. Patent (CN200920179686.2) published a wheel noise-reducing damper which has one damping ring and a connector that connects the two ends of the open section of the ring through two holes at each end. A closed ring-shaped noise-reducing damper is then made. But the connection between the ring and the connector requires heave-duty adhesive and the connected area is limited, which affect the stability of the connection, the effect of noise reduction and the safety. For the long-term use, the effect of noise reduction will gradually diminish and new noise may also arise as wear occurs between the damping ring and the groove.

BRIEF SUMMARY OF THE INVENTION

The objective of this invention is to provide a noise-reducing damper which can overcome the shortcomings of the current technology, better reduce the running noise of the wheel and ensure effective connection between the damping connector and the open ends of the damping ring. The noise-reducing damper provides adequate compensation for the open ends and utilizes the centrifugal force the spinning wheel to improve the effect of noise reduction during the running of the vehicle. By doing so the noise reduction effect and safety can be maintained even there is wearing in the damping ring.

In this invention, the noise-reducing damper has a damping connector and ring.

The open section of the damping ring has an angled plane or ladder-shaped surface; the damping connector has a pipe-shaped object which is slightly shorter than the length of the open section of the damping ring; at the two ends of the pipe-shaped object are two locating objects, which on one side has a bar that can go through the end of the pipe-shaped object, and on the other side has angled plane or ladder-shaped surface matching the end of the open section of the damping ring. Inside the pipe-shaped object, there is a spring which can push out the two locating objects. The locating object has a locating hole which is used to fix the location of the locating object by inserting a bar from outside the pipe-shaped object into the hole; when the bar is pulled out the two locating objects will be pushed out and stay connected with the damping ring.

During the installation of the damper, the damping ring is installed into the groove on the wheel with its open section being connected through matching the angled planes or ladder-shaped surfaces between the connector and the ring. With the interacting effect occurring in the axial, radical and peripheral directions, the damping ring and the connector are strongly attached to the wheel.

The shape of the pipe-shaped object can be adjusted to a certain degree of radian so as to provide maximized noise reduction and strengthen the location of the connector as well as making the running of the wheel more safe and stable.

In the attached figures, the damping ring connector has a left-right symmetrical structure and therefore the figures only presents half of the symmetrical structure and skips the other half.

DETAILED DESCRIPTION OF THE INVENTION

Figure 1:
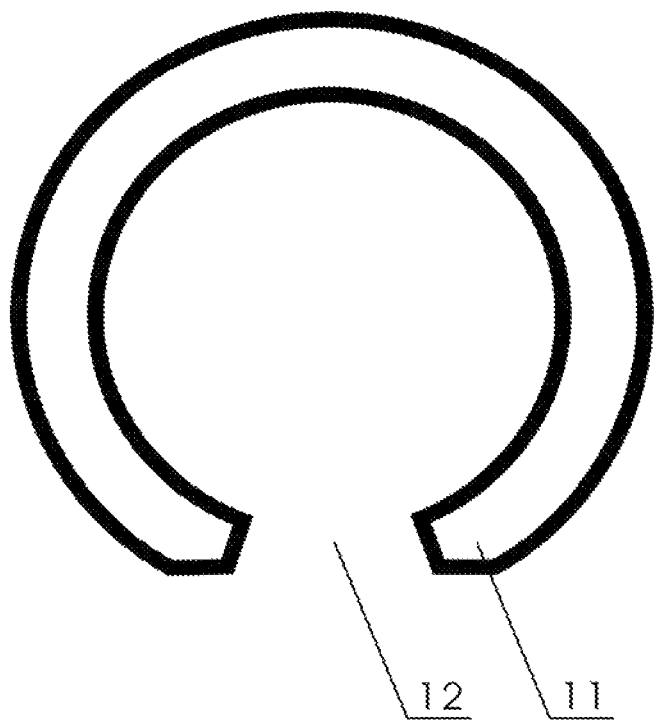
FIG. 1 is the structural figure of the damping ring in Example 1 of this invention.
Figure 2:
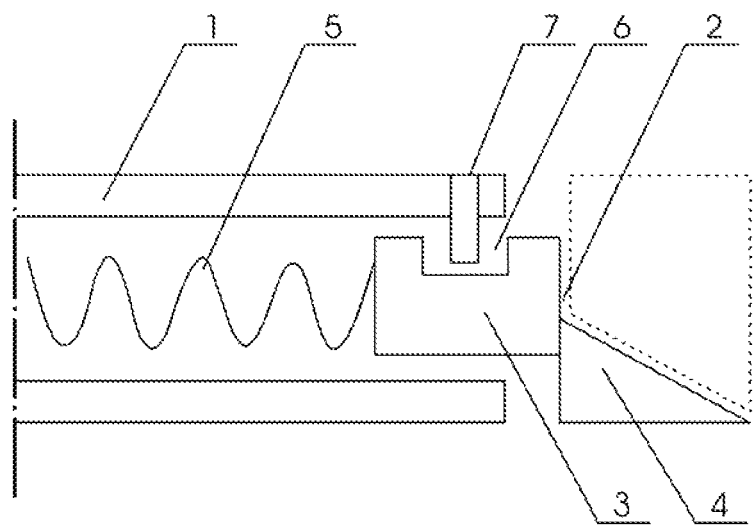
FIG. 2 is the axial section structural figure of the damping ring connector in Example 1 of this invention.

In Example 1 demonstrated in FIG. 1 and FIG. 2, the connector has a pipe-shaped object 1 which is slightly shorter than the open section 12 of the damping ring; at the two ends of the pipe-shaped object 1 are two locating objects 2 that has a bar 3 which can get through the pipe-shaped object 1 and a wedge-shaped object 4 which matches the angled plane (shown with dashed lines) of the end of the damping ring. Inside the pipe-shaped object 1 there is a spring 5 which can push out the two locating objects 2 at the two ends of the pipe-shaped object 1; the locating object 2 has a locating hole 6 through which a locating bar 7 can get into from the pipe-shaped object 1 to fix the location of the locating object 2; when the locating bars 7 are pulled out, the locating objects are pushed out by the spring and connected with the damping ring.

The damping ring 11 is a round metal ring with an open section 12 whose ends are comprised of a plane roughly in the radical direction and an angled plane facing the outside of the damping ring.

When the damping ring 11 is installed in the installation groove (not shown in the figures), the angled plane matches the end of the connector. With the interacting effect on the damping ring, connector and the wheel installation groove in the axial, radical and peripheral directions, the damping ring and connector are strongly attached to the wheel.

Figure 3:
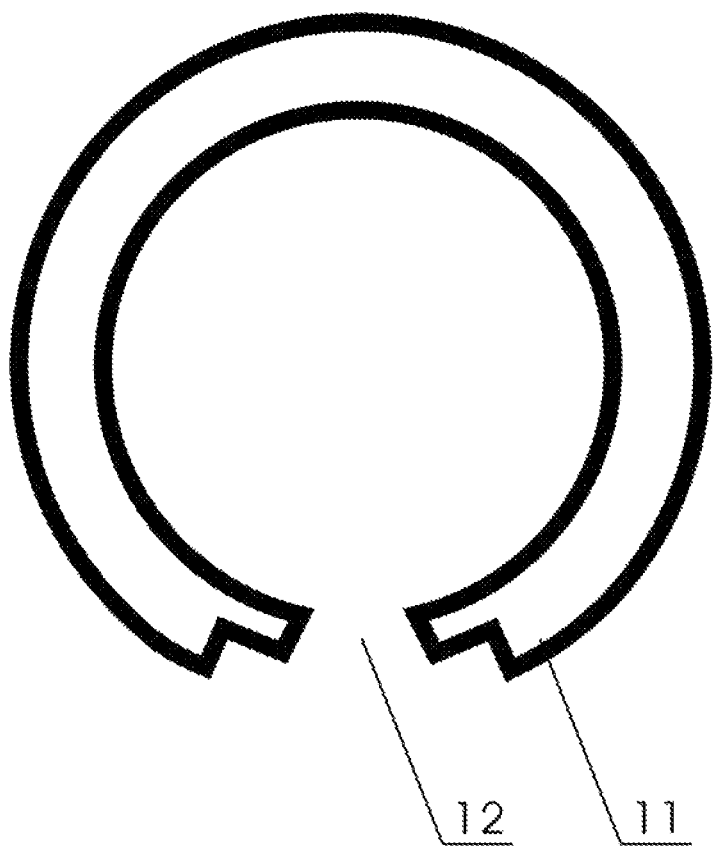
FIG. 3 is the structural figure of the damping ring of Example 2 of this invention.
Figure 4:
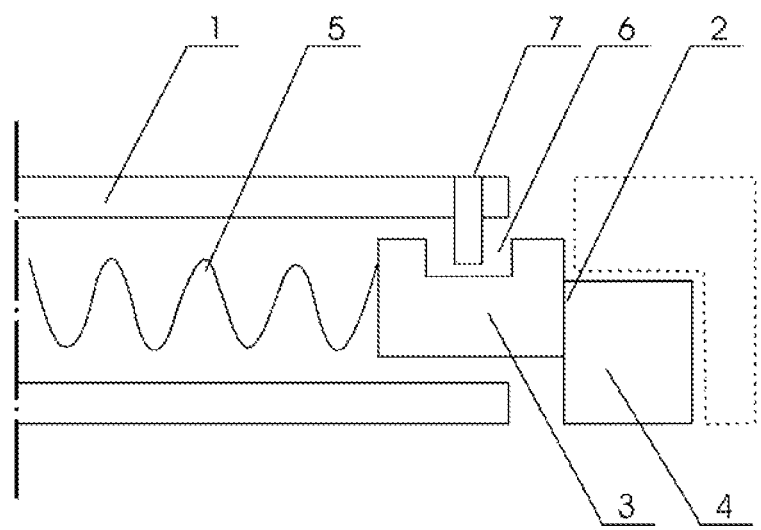
FIG. 4 is the axial section structural figure of the damping ring connector in Example 2 of this invention.

In Example 2 demonstrated in FIG. 3 and FIG. 4, the connector has a pipe-shaped object 1 which is slightly shorter than the open section 12 of the damping ring; at the two ends of the pipe-shaped object 1 are two locating objects 2 that has a bar 3 which can go through the pipe-shaped object 1 and a wedge-shaped object 4 which matches the ladder-shaped surface (shown by dashed lines) of the end of the damping ring. Inside the pipe-shaped object 1 there is a spring 5 which can push out the two locating objects 2 at the two ends of the pipe-shaped object 1; the locating object 2 has a locating hole 6 through which a locating bar 7 is can get into the pipe-shaped object 1 to fix the location of the locating object 2; when the locating bars 7 are pulled out, the locating objects are pushed out by the spring and connected with the damping ring 11.

The damping ring 11 is a round metal ring with an open section 12 whose ends are comprised of a plane roughly in the radical direction and an ladder-shaped surface facing the outside of the damping ring.

When the damping ring 11 is installed in the installation groove (not shown in the figures), the ladder-shaped surface matches the end of the connector. With the interacting effect on the damping ring, connector and the wheel installation groove in the axial, radical and peripheral directions, the damping ring and connector are strongly attached to the wheel.

Figure 5:
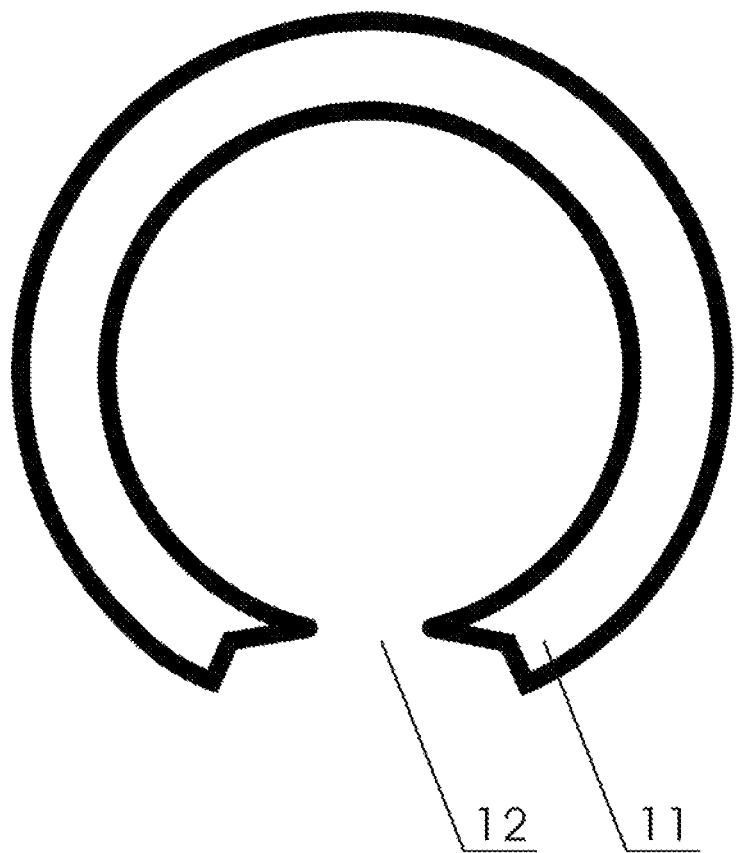
FIG. 5 is the structural figure of the damping ring in Example 3 of this invention.
Figure 6:
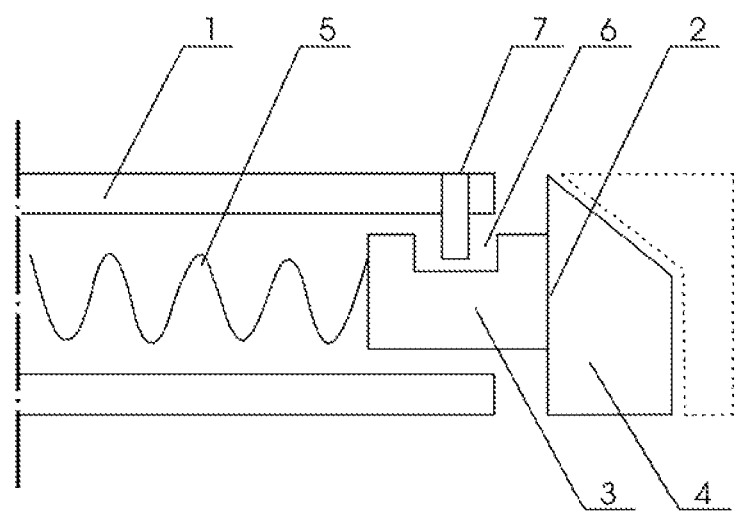
FIG. 6 is the axial section structural figure of the damping ring connector in Example 3 of this invention.

In Example 3 demonstrated in FIG. 5 and FIG. 6, the connector has a pipe-shaped object 1 which is slightly shorter than the open section 12 of the damping ring; at the two ends of the pipe-shaped object 1 are two locating objects 2 that has a bar 3 which can go through the pipe-shaped object 1 and a wedge-shaped object 4 which matches the angled plane (shown with dashed lines) of the end of the damping ring. Inside the pipe-shaped object 1 there is a spring 5 which can push out the two locating objects 2 at the two ends of the pipe-shaped object 1; the locating object 2 has a locating hole 6 through which a locating bar 7 can get into the pipe-shaped object 1 to fix the location of the locating object 2; when the locating bars 7 are pulled out, the locating objects are pushed out by the spring and connected with the damping ring 11.

The damping ring 11 is a round metal ring with a open section 12 whose ends are comprised of a plane roughly in the radical direction and an angled plane facing the outside of the damping ring.

When the damping ring 11 is installed in the installation groove (not shown in the figures), the angled plane matches the end of the connector. With the interacting effect on the damping ring, connector and the wheel installation groove in the axial, radical and peripheral directions, the damping ring and connector are strongly attached to the wheel.

Figure 7:
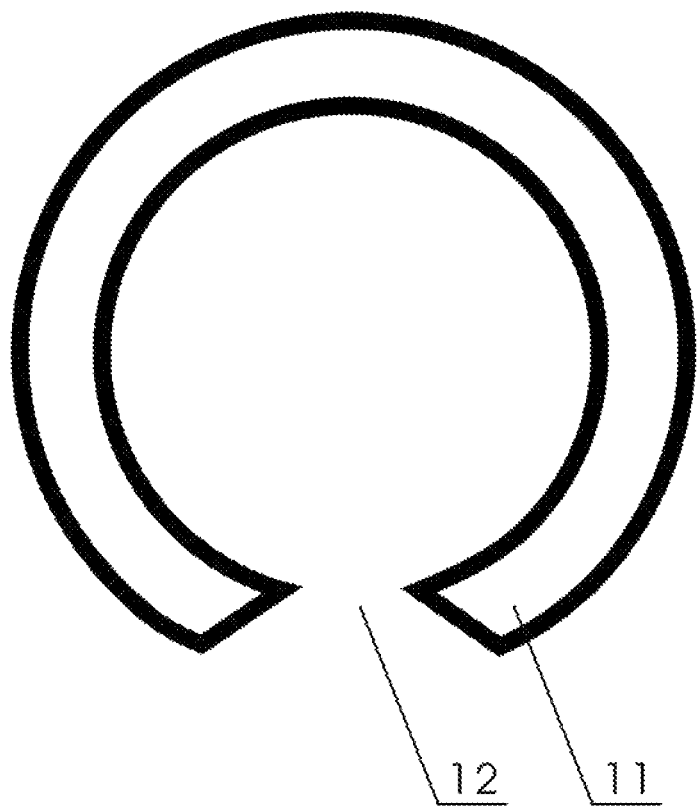
FIG. 7 is the structural figure of the damping ring in Example 4 of this invention.
Figure 8:
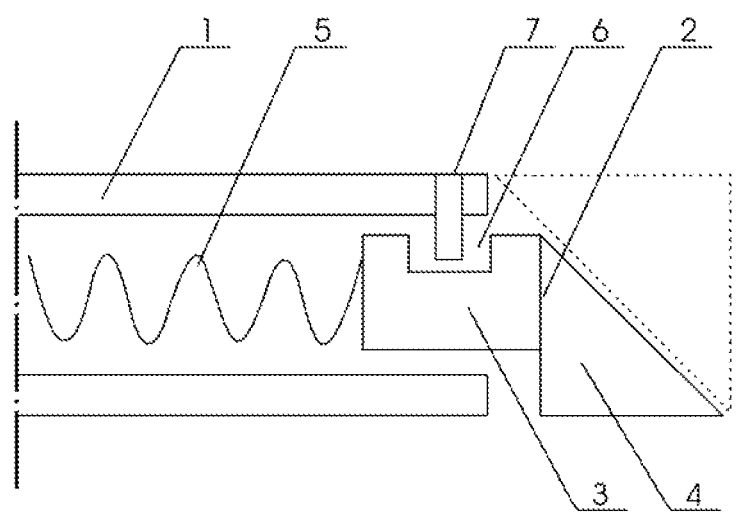
FIG. 8 is the axial section structural figure of the damping ring connector in Example 4 of this invention.

In Example 4 demonstrated in FIG. 7 and FIG. 8, the connector has a pipe-shaped object 1 which is slightly shorter than the open section 12 of the damping ring; at the two ends of the pipe-shaped object 1 are two locating objects 2 that has a bar 3 which can go through the pipe-shaped object 1 and a wedge-shaped object 4 whose angled plane matches the angled plane (shown by dashed lines) of the end of the damping ring. Inside the pipe-shaped object 1 there is a spring 5 which can push out the two locating objects 2 at the two ends of the pipe-shaped object 1; the locating object 2 has a locating hole 6 through which a locating bar 7 can get into the pipe-shaped object 1 to fix the location of the locating object 2; when the locating bars 7 are pulled out, the locating objects are pushed out by the spring and connected with the damping ring.

The damping ring 11 is a round metal ring with an open section 12 whose ends have an angled plane facing the outside of the damping ring.

When the damping ring 11 is installed in the installation groove (not shown in the figures), the angled plane matches the end of the connector. With the interacting effect on the damping ring, connector and the wheel installation groove in the axial, radical and peripheral directions, the damping ring and connector are strongly attached to the wheel.

Figure 9:
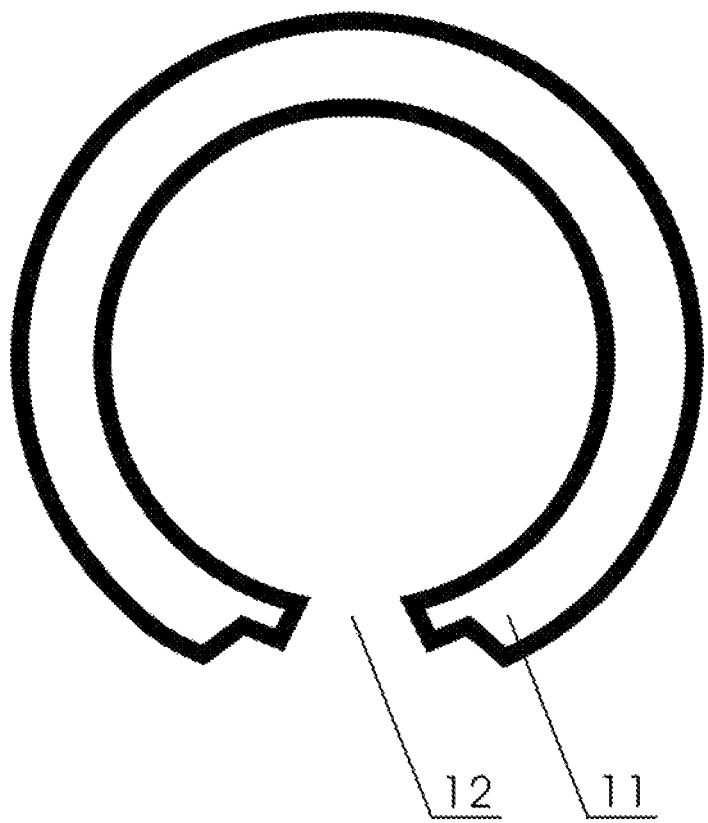
FIG. 9 is the structural figure of the damping ring in Example 5 of this invention.
Figure 10:
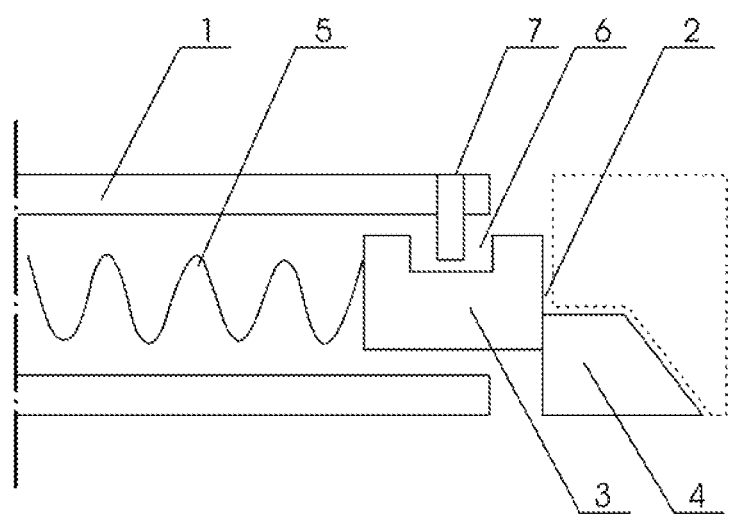
FIG. 10 is the axial section structural figure of the damping ring connector in Example 5 of this invention.

In Example 5 demonstrated in FIG. 9 and FIG. 10, the connector has a pipe-shaped object 1 which is slightly shorter than the open section 12 of the damping ring; at the two ends of the pipe-shaped object 1 are two locating objects 2 that has a bar 3 which can get through the pipe-shaped object 1 and a wedge-shaped object 4 whose angled plane matches the angled plane (shown by dashed lines) of the end of the damping ring. Inside the pipe-shaped object 1, there is a spring 5 which can push out the two locating objects 2 at the two ends of the pipe-shaped object 1; the locating object 2 has a locating hole 6 through which a locating bar 7 can get into the pipe-shaped object 1 to fix the location of the locating object 2; when the locating bars 7 are pulled out, the locating objects are pushed out by the spring and connected with the damping ring.

The damping ring 11 is a round metal ring with an open section 12 whose ends have an angled plane facing the outside of the damping ring.

When the damping ring 11 is installed in the installation groove (not shown in the figures), the angled plane matches the end of the connector. With the interacting effect on the damping ring, connector and the wheel installation groove in the axial, radical and peripheral directions, the damping ring and connector are strongly attached to the wheel.

Figure 11:
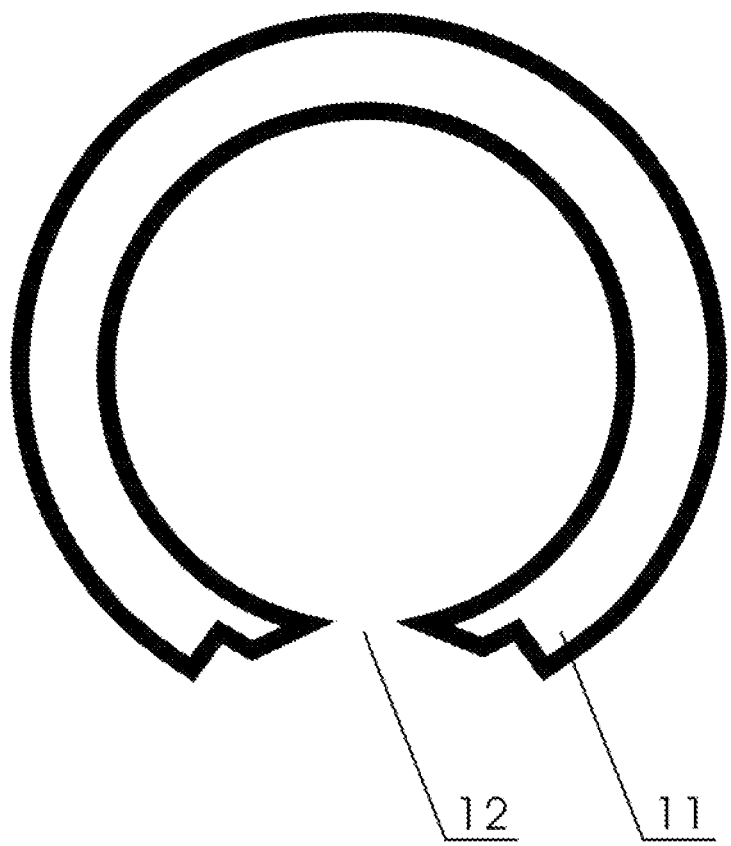
FIG. 11 is the structural figure of the damping ring in Example 6 of this invention.
Figure 12:
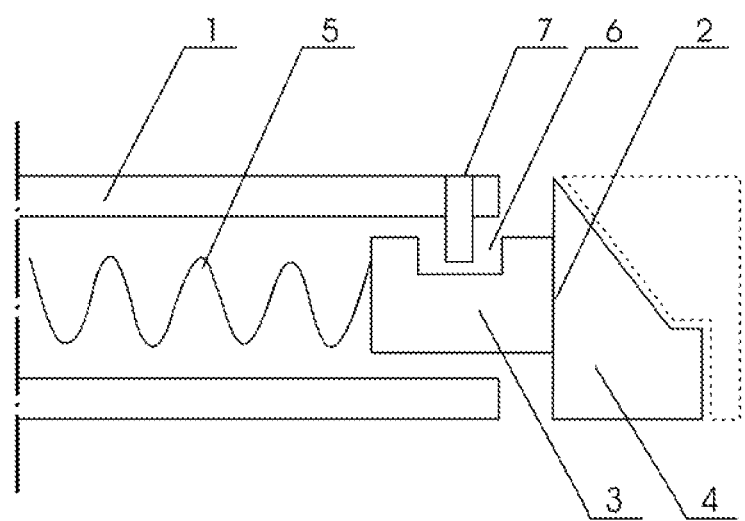
FIG. 12 is the axial section structural figure of the damping ring connector in Example 6 of this invention.

In Example 6 demonstrated in FIG. 11 and FIG. 12, the connector has a pipe-shaped object 1 which is slightly shorter than the open section 12 of the damping ring; at the two ends of the pipe-shaped object 1 are two locating objects 2 that has a bar 3 which can get into the pipe-shaped object 1 and a wedge-shaped object 4 whose angled plane matches the angled plane (shown by dashed lines) of the end of the damping ring. Inside the pipe-shaped object 1 there is a spring 5 which can push out the two locating objects 2 at the two ends of the pipe-shaped object 1; the locating object 2 has a locating hole 6 through which a locating bar 7 can get into the pipe-shaped object 1 to fix the location of the locating object 2; when the locating bars 7 are pulled out, the locating objects are pushed out by the spring and connected with the damping ring.

The damping ring 11 is a round metal ring with an open section 12 whose ends are comprised of a plane roughly in the radical direction and an angled plane facing the outside of the damping ring.

When the damping ring 11 is installed in the installation groove (not shown in the figures), the angled plane matches the end of the connector. With the interacting effect on the damping ring, connector and the wheel installation groove in the axial, radical and peripheral directions, the damping ring and connector are strongly attached to the wheel.

In the above-mentioned examples, the length of the open section 12 of the damping ring 11 is determined as such the length of the diameter of the damping ring 11 enables the damping ring 11 to be installed in the groove when the two ends of the open section 12 touches or the damping ring 11 is pushed into the groove continuously after putting one end of the open section 12 of the damping ring 11 into the groove.

In the above-mentioned examples, the pipe-shaped object 1 can be designed with the same degree of radical and axial curvature as that of the installation groove.

In this invention, one of the two locating objects 2 can be fixed to one end of the pipe-shaped object 1 or both of them can be fixed to the pipe-shaped object.

What is claimed is:

1. A vehicle wheel noise-reducing damper, comprising a damping connector and a damping ring, wherein:
   the damping ring has an open section, and one end of the open section has an angled plane;
   the damping connector has a pipe-shaped object whose length is slightly shorter than a length of the open section of the damping ring;
   on two ends of the pipe-shaped object, there are two locating objects each having a bar that can get through one end of the pipe-shaped object, and a wedge-shaped object having an angled plane matching the angled plane of the end of the open section of the damping ring; and
   inside the pipe-shaped object, there is a spring for pushing out the two locating objects at the two ends of the pipe-shaped object.

2. A vehicle wheel noise-reducing damper, comprising a damping connector and a damping ring, wherein:
   the damping ring has an open section, and one end of the open section has a ladder-shaped surface;
   the damping connector has a pipe-shaped object whose length is slightly shorter than a length of the open section of the damping ring;
   on two ends of the pipe-shaped object, there are two locating objects each having a bar that can get through one end of the pipe-shaped object, and a wedge-shaped object having a ladder-shaped surface matching the ladder-shaped surface of the end of the open section of the damping ring; and
   inside the pipe-shaped object there is a spring for pushing out the two locating objects at the two ends of the pipe-shaped object.

3. The vehicle wheel noise reducing damper according to claim 2, wherein:
   each locating object has a locating hole to allow a bar to get through the pipe-shaped object and the locating object.

4. The vehicle wheel noise-reducing damper according to claim 2, wherein:
   one of the two locating objects is fixed to one end of the pipe-shaped object.

5. The wheel noise-reducing damper according to claim 2, wherein:
   the pipe-shaped object has same peripheral and axial curvature as an installation groove of the damping ring.

6. The vehicle wheel noise reducing damper according to claim 1, wherein:
   each locating object has a locating hole to allow a bar to get through the pipe-shaped object and the locating object.

7. The vehicle wheel noise-reducing damper according to claim 1, wherein:
   one of the two locating objects is fixed to one end of the pipe-shaped object.

8. The wheel noise-reducing damper according to claim 1, wherein:
   the pipe-shaped object has same peripheral and axial curvature as an installation groove of the damping ring.

* * * * *